Aug. 21, 1934.  W. F. MESINGER ET AL  1,971,013
VALVE
Filed Dec. 16, 1930
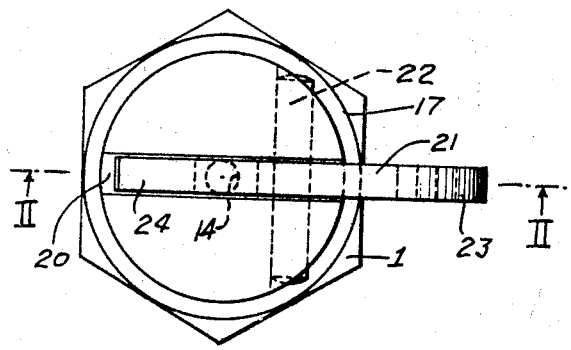
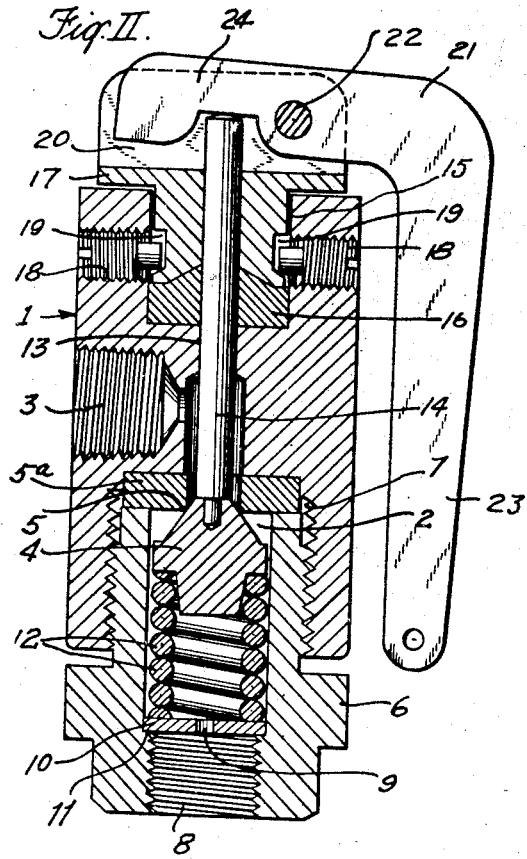
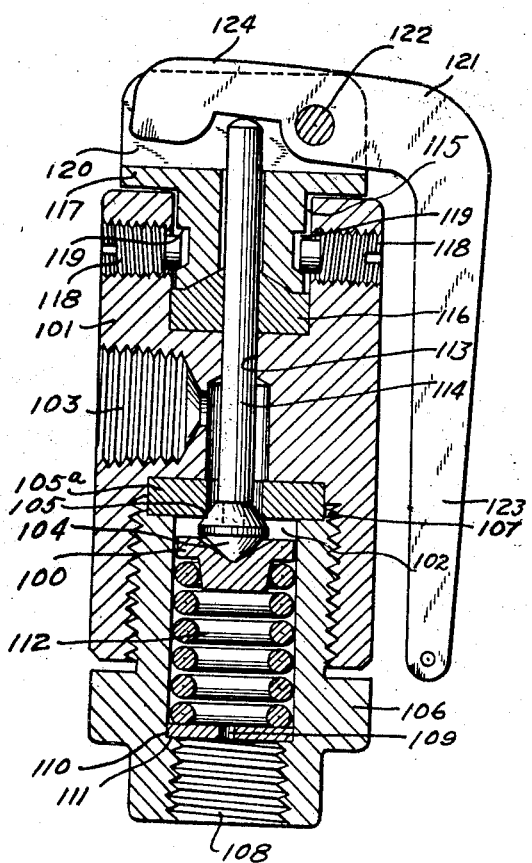
William F. Mesinger,
Harry J. Baker,
INVENTORS,
BY
Byrnes Townsend & Potter,
ATTORNEYS.

Patented Aug. 21, 1934

1,971,013

UNITED STATES PATENT OFFICE 1,971,013

VALVE

William F. Mesinger and Harry J. Baker, Indianapolis, Ind., assignors to Prest-O-Lite Company, Inc., a corporation of New York Application December 16, 1930, Serial No. 502,822

7 Claims. (Cl. 251—134)

Our invention relates to a valve assembly of the poppet type.

Our valve assembly is particularly suitable for use in priming internal combustion engines with acetylene which is supplied to the intake manifold while they are being started, but this valve assembly is not limited to this particular use. Where acetylene is used to supply light for the operation of the engine, it is most convenient to supply the priming valve with acetylene directly from the light supply line and at the same pressure. It has also been found that the quantity of acetylene delivered to the intake manifold should be proportional to the piston displacement of the engine. It is desirable to construct a single valve which is adapted to be connected to a supply of acetylene at a standard pressure, such as the light supply line, and deliver to the intake manifold a quantity of acetylene which may be regulated to suit each engine having a particular piston displacement.

Therefore one of the objects of our invention is to provide a means in the valve assembly for obtaining the passage of a desired volume of gas per unit of time for a predetermined differential of pressure in the inlet and discharge side of the valve.

Another object of our invention is to construct a valve which is adapted to be assembled in a pipe line and then adjusted without disturbing the pipe connections so the valve can be operated at a distant point in any desired direction.

Another object of our invention is to construct a valve which is leak-proof and is adapted to be easily assembled.

An embodiment of our invention is shown in the accompanying drawing; in which,

Fig. I is a top plan view of the valve;

Fig. II is a vertical section taken in part on the line II—II in Fig. I; and

Fig. III is a vertical section of a modification of the valve.

Referring to the above drawing, the valve body 1 is made in one piece and it is provided with a valve chamber 2 to which fluid under pressure is supplied. A lateral discharge outlet 3 is provided in the valve body above the valve chamber, and it is adapted to be placed in and out of communication with the chamber by a poppet valve 4 which cooperates with a seat 5 in a valve seat disc 5a. The valve body 1 is provided with a central bore 13 which extends therethrough. A counter-bore 7, concentric with the bore 13, is formed in the lower end of the valve body. A plug 6, having a cavity comprising the valve chamber 2, is screwed into the counter-bore 7 until the rim of the chamber forces the valve seat disc 5a against the inner end of the counter-bore. The outer end of the plug 6 is adapted to be connected to a fluid supply pipe which may be connected to the threaded opening 8. The quantity of fluid passing per unit of time to the valve chamber 2 is controlled by the size of the orifice 9 in a flow control member or removable disc 10 which rests upon a shoulder 11 in the chamber. The disc 10 can be conveniently exchanged for a disc having any given size orifice opening to provide the correct flow of gas for an engine having a certain piston displacement. For example, the disc 10 having an orifice 9 therein may be interchanged with a disc having a smaller orifice such as is shown in the corresponding disc in Fig. III. A spring 12 is compressed between the disc and the bottom of the valve 4, to hold the valve on its seat.

A valve stem 14 is attached to the valve 4 and it extends through the upper end of the bore 13 to the outside of the valve body. A counter-bore 15 is formed about the central bore 13. A valve stem packing 16 and a gland 17 fits into the counter-bore 15 about the valve stem 14. A plurality of set screws 18 extend into the valve body 1. The inner ends of the screws 18 engage the lower beveled side of a circumferential groove 19 in the gland 17 and force the gland toward the bottom of the counter-bore 15 and against the packing 16.

The circumferential groove 19 and set screws 18 which are adapted to press against any radius of said beveled side of said circumferential groove serve two purposes, one of which is to provide a means for compressing the valve stem packing and the other of which is to provide a means for permitting the adjustment of the valve operating means, so that the valve can be operated from any direction.

The top of the valve stem gland 17 is provided with a slot 20 which intersects the bore in the gland through which the valve stem 14 passes. A bellcrank lever 21 is pivoted in the slot 20 on a pin 22 which extends across the slot. One arm 23 of the lever 21 extends downwardly along the valve body 1 and the other arm 24 extends along the slot 20, and is adapted to engage the valve stem 14. A rod or a flexible member such as a cord (not shown) may be attached to the downwardly extending arm 23 to pull it away from the valve body 1 and actuate the other arm 24 of the lever against the top of the valve stem 14 to open the valve 4. When the lever 21 is released the force exerted by the valve spring 12 and the inlet pressure acts upon the valve 4 and holds it against its seat 5.

In the modification of our invention disclosed in Fig. III, a cap 100 having a conical recess therein is placed on top of the valve spring 112. The valve 104 has a pointed base which fits in the apex of the recess with a space between the side walls of the valve base and the side wall of the recess. This construction equalizes any variation in pressure of the spring 112 at all points on the circumference of the cap and allows the valve to be seated with a uniform pressure at all points of its seat. The other details of this modification are the same as those disclosed in Fig. II, and they bear the same reference numerals with the addition of 100.

While we have described our invention in reference to its use as a priming valve, it is to be understood that our invention is not limited to this particular use and that the details of the valve may be modified without departing from the scope of our invention as defined in the appended claims.

We claim:

1. A valve assembly comprising a valve body having a longitudinal bore extending therethrough to provide a valve chamber, an inlet to said chamber and an outlet from said chamber, said bore having an enlarged counter-bore, a valve seat disc in said counter-bore, said disc having a bore therein to provide a valve seat, a valve cooperating with said seat, a plug secured in said counter-bore, said plug having a cavity comprising the valve chamber and the inlet to said chamber, the rim of said plug being seated against said valve seat disc, and a spring compressed between said valve and a shoulder in said valve chamber.

2. A valve assembly comprising a valve body having a longitudinal bore extending therethrough to provide a valve chamber, an inlet to and an outlet from said chamber, said bore having an enlarged counter-bore, a valve seat disc in said counter-bore, said disc having a bore therein to provide a valve seat, a valve cooperating with said seat, a plug secured in said counter-bore, said plug having a cavity therein comprising the valve chamber and the inlet to said chamber, the rim of said plug being seated against said valve seat disc, a second disc seated against a shoulder in said valve chamber, said second disc having a flow control orifice therein, and a spring compressed between said second disc and said valve.

3. A valve assembly comprising a valve body having a longitudinal bore extending therethrough to provide a valve chamber, an inlet to and an outlet from said chamber, a poppet valve in said chamber to control the flow of fluid therefrom, said valve having a single pointed base, a cap having a recess for holding and centering the point of said base on the axis of said bore, and a spring compressed between said cap and a shoulder in said valve chamber.

4. A valve assembly comprising a valve body having a longitudinal bore extending therethrough to provide a valve chamber, an inlet to and an outlet from said chamber, said bore having an enlarged counter-bore, a valve seat in the inner end of said counter-bore, a valve cooperating with said seat, a plug secured in said counter-bore, said plug having a cavity therein comprising the valve chamber and the inlet to said chamber, a spring compressed between said valve and a shoulder in said chamber, a valve stem secured to said valve and extending upwardly through said longitudinal bore in said valve body, packing in said longitudinal bore around said stem, a valve stem gland around said stem, an annular shoulder on said gland, screws in said valve body adapted to engage any radius of said shoulder to force said gland against said packing and to secure said gland to said valve body in any rotative position about said valve stem, and a lever mounted on said gland to actuate said valve stem.

5. A valve assembly comprising a valve body having a longitudinal bore extending therethrough to provide a valve chamber, an inlet to and an outlet from said chamber, said bore having an enlarged counter-bore, a valve seat in the inner end of said counter-bore, a valve cooperating with said seat, a plug secured in said counter-bore, said plug having a cavity therein comprising the valve chamber and the inlet to said chamber, a disc seated on an annular shoulder in said chamber, said disc having a flow control orifice therein, a spring in said valve chamber compressed between said valve and said disc, a valve stem secured to said valve and extending upwardly through said longitudinal bore in said valve body, packing in said longitudinal bore around said stem, a valve stem gland around said stem, an annular shoulder on said gland, screws in said valve body adapted to engage any radius of said shoulder to force said gland against said packing and to secure said gland to said valve body in any rotative position about said valve stem, and a lever mounted on said gland to actuate said valve stem.

6. A valve assembly comprising a valve body having a longitudinal bore extending therethrough to provide a fluid passage including a valve chamber, an outlet from said fluid passage, an inlet to said fluid passage, said bore having an enlarged counter-bore, a valve seat in the inner end of said enlarged counter-bore, a valve cooperating with said seat, a plug secured in said counter-bore, said plug having a cavity in said counter-bore, said plug having a cavity comprising the valve chamber and the inlet to said fluid passage, a spring for normally maintaining said valve on its seat, and a flow control member within said fluid passage adapted to secure a definite flow of fluid for a predetermined differential of pressure between the opposite sides of said member independent of said valve, said member having an orifice therein and being adapted to be interchanged with another member having an orifice of a different size.

7. A valve assembly comprising a valve body having a passage extending therethrough, said passage comprising a counterbore and having a lateral outlet in said body communicating through part of said passage with said counterbore; a valve seat disc in the bottom of said counterbore having a central aperture registering with the part of said passage between said outlet and said counterbore; a valve controlling said aperture and having a stem extending through said passage beyond the counterbore and projecting from one end of said body; a plug secured in said counterbore and having a cavity provided with an inlet and an internal shoulder adjacent said inlet, the inner rim of said plug holding said disc in place; and a spring compressed between said valve and said internal shoulder.

WILLIAM F. MESINGER.
HARRY J. BAKER.

CERTIFICATE OF CORRECTION.

Patent No. 1,971,013. August 21, 1934.

WILLIAM F. MESINGER, ET AL.

It is hereby certified that the name of the assignee in the above numbered patent was erroneously described and specified as "Prest-O-Lite Company, Inc." whereas said name should have been described and specified as The Prest-O-Lite Company, Inc., as shown by the records of assignments in this office; and that the said Letters Patent should be read with this correction therein that the same may conform to the record of the case in the Patent Office.

Signed and sealed this 2nd day of October, A. D. 1934.

Leslie Frazer (Seal) Acting Commissioner of Patents.